(12) United States Patent
Mitsuma et al.

(10) Patent No.: US 12,280,527 B2
(45) Date of Patent: Apr. 22, 2025

(54) INJECTION MOLDING MACHINE MANAGEMENT SYSTEM

(71) Applicant: Seiko Epson Corporation, Tokyo (JP)

(72) Inventors: Yusuke Mitsuma, Shiojiri (JP); Yoshiaki Otsuki, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 219 days.

(21) Appl. No.: 17/824,949

(22) Filed: May 26, 2022

(65) Prior Publication Data

US 2022/0379533 A1 Dec. 1, 2022

(30) Foreign Application Priority Data

May 27, 2021 (JP) ................................ 2021-089066

(51) Int. Cl.
*B29C 45/17* (2006.01)
*B29C 45/76* (2006.01)

(52) U.S. Cl.
CPC .......... *B29C 45/1774* (2013.01); *B29C 45/76* (2013.01); *B29C 45/762* (2013.01); *B29C 45/768* (2013.01); *B29C 2045/7606* (2013.01); *B29C 2945/76163* (2013.01); *B29C 2945/76461* (2013.01)

(58) Field of Classification Search
CPC ...... B29C 45/762; B29C 45/768; B29C 45/76
See application file for complete search history.

(56) References Cited

U.S. PATENT DOCUMENTS

| 7,496,427 | B2 * | 2/2009 | Konishi | .................. B29C 45/76 |
| | | | | 700/197 |
| 7,517,206 | B2 | 4/2009 | Nishizawa | |
| 2006/0068049 | A1 | 3/2006 | Nishizawa | |
| 2016/0082504 | A1 * | 3/2016 | Okochi | .................. G06F 3/0482 |
| | | | | 425/162 |

(Continued)

FOREIGN PATENT DOCUMENTS

| CN | 111098464 A | * | 5/2020 | ............. B29C 45/76 |
| EP | 3659778 A1 | | 6/2020 | |

(Continued)

OTHER PUBLICATIONS

Machine translation EP3804951A1 (Year: 2021).*

(Continued)

*Primary Examiner* — Jacob T Minskey
*Assistant Examiner* — Wayne K. Swier
(74) *Attorney, Agent, or Firm* — Harness, Dickey & Pierce, P.L.C.

(57) ABSTRACT

An injection molding machine management system, which manages an injection molding unit including an injection molding machine and a peripheral device that performs a previous step or a subsequent step of a molding step, includes a first display unit that displays a first screen for displaying a state of the molding step of the injection molding machine. The first screen includes a first screen area and a second screen area. The first screen area displays a first indicator related to quality in the molding step of the injection molding machine, and the second screen area displays a second indicator related to quality in the previous step of the molding step or the subsequent step of the molding step.

1 Claim, 4 Drawing Sheets

(56) References Cited

U.S. PATENT DOCUMENTS

2018/0173210 A1    6/2018  Uchiyama et al.

FOREIGN PATENT DOCUMENTS

| EP | 3804951 A1 | * | 4/2021 | ............ | B29C 45/76 |
|----|------------|---|--------|--------------|------------|
| JP | 2006-088558 A | | 4/2006 | | |
| JP | 2018-094888 A | | 6/2018 | | |
| JP | 2019177522 A | * | 10/2019 | ............ | B29C 45/17 |
| JP | 2020-082701 A | | 6/2020 | | |
| WO | WO-9119601 A | * | 12/1991 | ............ | B29C 45/76 |
| WO | WO-2020227744 A1 | * | 11/2020 | ............ | B29C 45/76 |

OTHER PUBLICATIONS

Machine translation WO91/19601A (Year: 1991).*
Machine translation JP2019177522A (Year: 2019).*
Machine translation WO2020227744A1 (Year: 2020).*
Machine translation CN111098464A (Year: 2020).*
Machine translation JP2006088558A (Year: 2006).*
Machine translation MP2020082701A (Year: 2020).*

* cited by examiner

FIG. 2

SC1 — SCREEN OF MOLDING STEP

AR1: DEFECT RATE IN MOLDING STEP — 1200ppm

AR2: INSPECTION DEFECT RATE — 0ppm ; MATERIAL NON-DEFECT RATE — 87%

FIG. 3

SC2 — SCREEN OF MATERIAL DRYING STEP

AR4: MATERIAL NON-DEFECT RATE — 87%

AR3: DEFECT RATE IN MOLDING STEP — 1200ppm ; INSPECTION DEFECT RATE — 0ppm

FIG. 4

```
                                              SC2b
        ┌──────────────────────────────────────┐
        │ SCREEN OF INSPECTION STEP            │
        │  ┌────────────┐ ┌─────────────────┐  │
   AR4b │  │ INSPECTION │ │  MATERIAL    DEFECT RATE │ AR3b
        │  │ DEFECT RATE│ │NON-DEFECT RATE IN MOLDING STEP│
        │  │            │ │                 │  │
        │  │   0ppm     │ │   87%   1200ppm │  │
        │  └────────────┘ └─────────────────┘  │
        │                                      │
        └──────────────────────────────────────┘
```

FIG. 5

| SCREEN | INDICATOR | VALUE OF DISPLAYED INDICATOR | EXAMPLE OF OPERATION CONTENTS |
|---|---|---|---|
| SCREEN OF MATERIAL DRYING STEP (FIRST SCREEN) | MATERIAL NON-DEFECT RATE | NON-DEFECT RATE OF ONE MATERIAL DRYER | NON-DEFECT RATE DECREASES → CHANGE DRYING CONDITION |
| | DEFECT RATE IN MOLDING STEP | DEFECT RATE OF MOLDED PRODUCTS ASSOCIATED WITH MATERIAL TYPE | DEFECT RATE INCREASES → CHANGE DRYING CONDITION, AND PRESENT PAST MATERIAL CONDITION AND DRYING CONDITION TO OPERATOR |
| | | DEFECT RATE OF MOLDED PRODUCTS ASSOCIATED WITH ONE MATERIAL DRYER | |
| | INSPECTION DEFECT RATE | DEFECT RATE OF MOLDED PRODUCTS ASSOCIATED WITH ONE MATERIAL DRYER | DEFECT RATE INCREASES → PRESENT PAST MATERIAL CONDITION AND DRYING CONDITION TO SUPERVISOR |
| SCREEN OF MOLDING STEP (SECOND SCREEN) | MATERIAL NON-DEFECT RATE | NON-DEFECT RATE OF MATERIAL TYPE IN MOLDING | NON-DEFECT RATE DECREASES → SET LONGER PURGE TIME AND MORE PURGING OPERATION TIMES, AND SET HIGHER HOPPER SETTING TEMPERATURE WHEN DRYNESS IS INSUFFICIENT |
| | DEFECT RATE IN MOLDING STEP | DEFECT RATE OF ONE MOLDING MACHINE | DEFECT RATE INCREASES → CHANGE MOLDING CONDITION, AND CONFIRM WHETHER MOLDING CONDITION HAS BEEN CHANGED |
| | | DEFECT RATE OF MOLDED PRODUCTS IN MOLDING | |
| | INSPECTION DEFECT RATE | DEFECT RATE OF MOLDED PRODUCT TYPE IN MOLDING | DEFECT RATE INCREASES → CHANGE MOLDING CONDITION AFTER CONFIRMATION → CONFIRM CAUSES OF PERIPHERAL DEVICES → CHANGE MOLDING CONDITION → STOP MOLDING OF MOLDING MACHINE |
| | | DEFECT RATE OF ONE MOLDING MACHINE | |
| SCREEN OF INSPECTION STEP (SECOND SCREEN) | MATERIAL NON-DEFECT RATE | NON-DEFECT RATE OF MATERIAL TYPE IN INSPECTION | — |
| | DEFECT RATE IN MOLDING STEP | DEFECT RATE OF MOLDED PRODUCT TYPE IN INSPECTION | — |
| | INSPECTION DEFECT RATE | DEFECT RATE OF ONE INSPECTION DEVICE | DEFECT RATE INCREASES → NOTIFICATION TO MOLDING STEP |

INJECTION MOLDING MACHINE MANAGEMENT SYSTEM

The present application is based on, and claims priority from JP Application Serial Number 2021-089066, filed May 27, 2021, the disclosure of which is hereby incorporated by reference herein in its entirety.

BACKGROUND

1. Technical Field

The present disclosure relates to an injection molding machine management system.

2. Related Art

Regarding a system for injection molding machine management, for example, JP-A-2018-94888 discloses an injection molding machine management system that groups injection molding machines according to a predetermined reference and displays information for each group such as an operation rate, power consumption, a resin consumption amount, a non-defect rate, a defect rate, and an operation time of all injection molding machines belonging to the group.

However, there are various types of defects in injection molding, such as defects related to molding materials, defects in actual measurement values of an injection molding machine, defects in appearance inspection after molding, and defects in shipping inspection. Therefore, it is difficult to determine that a defect occurring in which step, such as a material drying step, a molding step, and an inspection step, needs to be dealt with only by displaying a defect rate of an entire group as in JP-A-2018-94888. As a result, production efficiency may be reduced.

SUMMARY

According to a first embodiment of the present disclosure, an injection molding machine management system that manages an injection molding unit is provided. The injection molding unit includes an injection molding machine and a peripheral device that performs a previous step or a subsequent step of a molding step. The injection molding machine management system includes a first display unit that displays a first screen for displaying a state of the molding step of the injection molding machine. The first screen includes a first screen area and a second screen area. The first screen area displays a first indicator related to quality in the molding step of the injection molding machine, and the second screen area displays a second indicator related to quality in the previous step of the molding step or the subsequent step of the molding step.

According to a second embodiment of the present disclosure, an injection molding machine management system that manages an injection molding unit is provided. The injection molding unit includes an injection molding machine and a peripheral device that performs a previous step or a subsequent step of a molding step. The injection molding machine management system includes an output unit that outputs a first indicator related to quality in the molding step of the injection molding machine and a second indicator related to quality in the previous step of the molding step or the subsequent step of the molding step.

BRIEF DESCRIPTION OF THE DRAWINGS

FIG. 2 is a diagram illustrating an example of a first screen.

FIG. 3 is a diagram illustrating an example of a second screen.

FIG. 4 is a diagram illustrating another example of the second screen.

FIG. 5 is a table illustrating a list of contents displayed by a display unit.

DESCRIPTION OF EXEMPLARY EMBODIMENTS

A. First Embodiment

Figure 1:
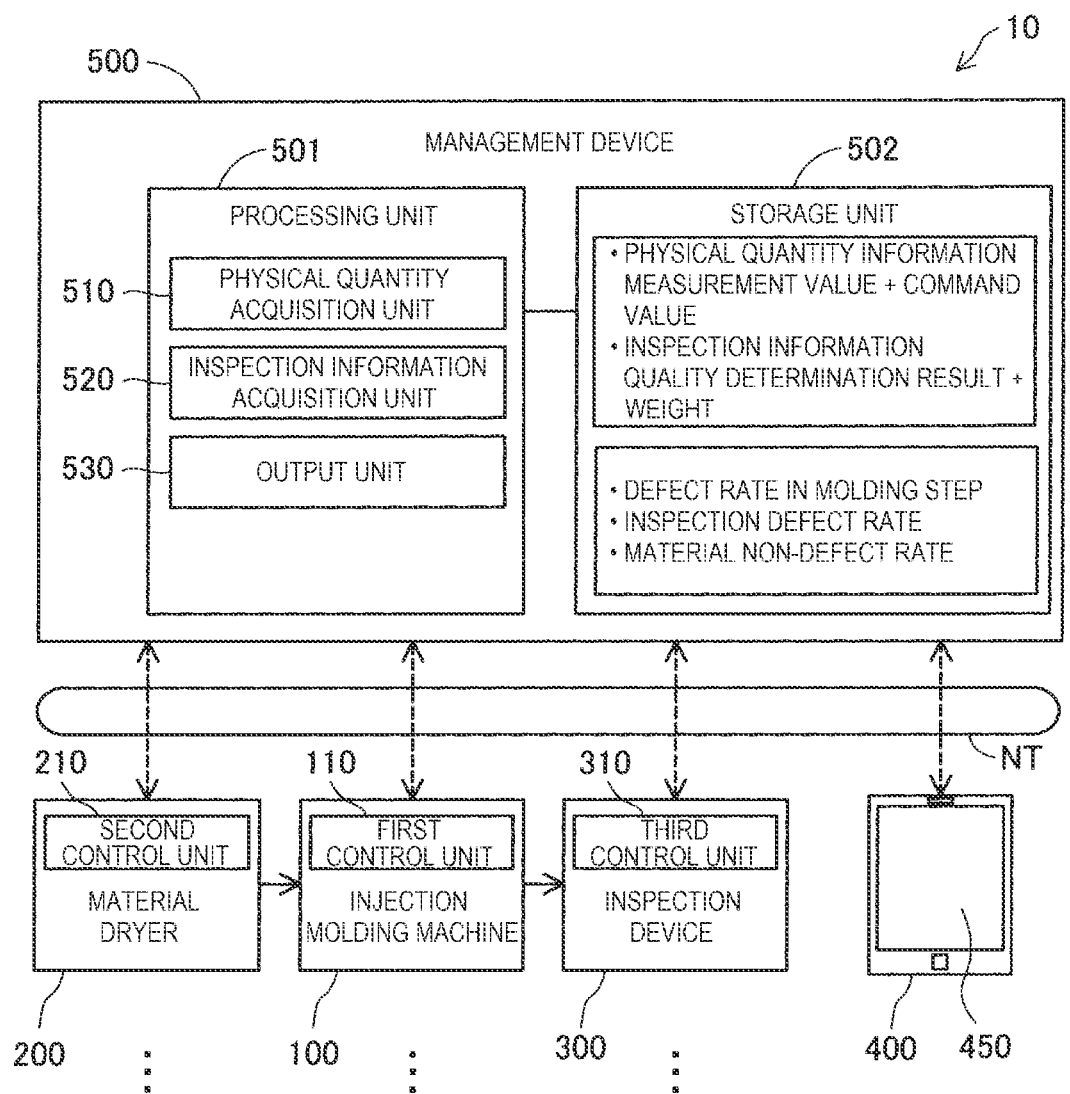
FIG. 1 is an explanatory diagram illustrating a schematic configuration of an injection molding machine management system.

FIG. 1 is an explanatory diagram illustrating a schematic configuration of an injection molding machine management system 10 according to a first embodiment. The injection molding machine management system 10 according to the present embodiment includes an injection molding machine 100, a material dryer 200, an inspection device 300, a terminal device 400, and a management device 500. The injection molding machine 100, the material dryer 200, and the inspection device 300 are disposed in, for example, the same housing or connected housings, and are integrally combined to form an injection molding unit. The management device 500 is communicably coupled to the injection molding machine 100, the material dryer 200, the inspection device 300, and the terminal device 400. In the present embodiment, the management device 500 is able to communicate with these devices via a network NT. The network NT may be, for example, a LAN, a WAN, or the Internet.

In the present embodiment, one injection molding machine 100, one material dryer 200, and one inspection device 300 are disposed for each injection molding unit. For example, a plurality of injection molding units are disposed in a factory. The material dryer 200 and the inspection device 300 are peripheral devices of the injection molding machine 100, and are devices that perform a previous step or a subsequent step of a molding step performed by the injection molding machine 100. That is, the injection molding unit is a unit including the injection molding machine 100 and peripheral devices that perform a previous step or a subsequent step of the molding step.

The injection molding machine 100 is a device that performs injection molding. The injection molding machine 100 performs the molding step. The injection molding machine 100 includes a first control unit 110, and an injection device and a mold clamping device (both not shown). The mold clamping device is mounted with a molding mold having a cavity. The molding mold may be made of metal, ceramic, or resin. A metal molding mold is referred to as a metal mold. The first control unit 110 is configured with a computer that includes one or a plurality of processors, a storage device, and an input and output interface through which signals are input and output from and to an outside. The first control unit 110 may be configured with a plurality of computers. As will be described later, a second control unit 210 of the material dryer 200 and a third control unit 310 of the inspection device 300 have the same configuration as the first control unit 110.

The first control unit 110 controls each unit of the injection molding machine 100 to perform injection molding and obtain a molded product. More specifically, the first control unit 110 controls the mold clamping device to mold-clamp the molding mold, and controls the injection device to plasticize a material and inject the plasticized material into the molding mold, thereby obtaining a molded product having a shape corresponding to a shape of the cavity provided in the molding mold. The molded product is conveyed to the inspection device 300 by a take-out robot (not shown).

The first control unit 110 transmits physical quantity information indicating a physical quantity related to injection molding to the management device 500. The physical quantity information includes measurement values measured by various sensors provided in the injection molding machine 100 and various command values related to injection molding. A command value is, for example, a value set in the injection molding machine 100, such as an injection filling time, an injection pressure, and a set temperature, and a measurement value is a value obtained by measuring these actual values by the sensors.

The material dryer 200 is a device that dries a material to be supplied to the injection molding machine 100. In the material dryer 200, a material drying step, which is a step prior to the molding step, is performed. The material dryer 200 includes the second control unit 210, and a heater and a drying hopper (both not shown). The material dryer 200 removes moisture in the air with a moisture absorbent, heats the dry air with the heater, and sends the heated air into the drying hopper to dry the material stored in the drying hopper. The dried material is pressure-fed to the injection molding machine 100 by a pressure-feed pump (not shown). The second control unit 210 controls a drying temperature of the heater and an air volume of the dry air to be sent to the drying hopper.

The inspection device 300 is a device that performs image inspection. In the inspection device 300, an image inspection step, which is a subsequent step of the molding step, is performed. The inspection device 300 includes the third control unit 310, a camera, and a weight sensor. The third control unit 310 performs appearance inspection on a molded product by controlling the camera to capture an image of the molded product and analyzing the captured image of the molded product. In addition, the third control unit 310 measures a weight of the molded product by the weight sensor. The third control unit 310 transmits inspection information indicating information related to an inspection result and the weight of the molded product to the management device 500. The inspection device 300 may inspect the molded product immediately after the molding step performed by the injection molding machine 100, or may inspect the molded product before shipment. Inspection before shipment may be sampling inspection rather than total inspection. The weight of the molded product may be measured by a device different from the inspection device 300 and transmitted to the management device 500.

The terminal device 400 is configured as a computer that includes a CPU, a storage device and a display unit 450. For example, a tablet terminal, a notebook-type personal computer, or a smartphone can be applied as the terminal device 400. In the present embodiment, the display unit 450 is provided with a touch panel function. The display unit 450 displays various screens output from the management device 500. In another embodiment, the display unit 450 may be provided in the management device 500. The display unit 450 in the present embodiment corresponds to at least a "first display unit" and/or a "second display unit".

The management device 500 is configured with a computer that includes a processing unit 501 and a storage unit 502. The processing unit 501 includes a CPU and a main storage device. The storage unit 502 includes an auxiliary storage device such as a hard disk drive.

The processing unit 501 includes a physical quantity acquisition unit 510, an inspection information acquisition unit 520, and an output unit 530. The physical quantity acquisition unit 510, the inspection information acquisition unit 520, and the output unit 530 are implemented by the processing unit 501 executing a program stored in the storage unit 502. These units may be implemented with a circuit.

The physical quantity acquisition unit 510 acquires physical quantity information from the injection molding machine 100. The physical quantity acquisition unit 510 stores the acquired physical quantity information in the storage unit 502.

The inspection information acquisition unit 520 acquires inspection information from the inspection device 300. The inspection information acquisition unit 520 stores the acquired inspection information in the storage unit 502.

The processing unit 501 performs various calculations and statistical processing by using the information stored in the storage unit 502 by the physical quantity acquisition unit 510 and the inspection information acquisition unit 520, and stores results thereof in the storage unit 502. In the present embodiment, the processing unit 501 calculates a defect rate in the molding step, an inspection defect rate, and a material non-defect rate. These values are referred to as factory management key performance indicators (KPIs). The processing unit 501 calculates a factory management key performance indicator for an individual device.

The defect rate in the molding step is a proportion of defects in the molding step performed by the injection molding machine 100. For example, the processing unit 501 compares a command value and a measurement value included in the physical quantity information acquired by the physical quantity acquisition unit 510 for each shot, and determines that molding in the shot is defective when a difference between the measurement value and the command value is equal to or larger than a predetermined threshold. The processing unit 501 calculates the defect rate in the molding step by obtaining the proportion of defects with respect to the number of shots.

The inspection defect rate is a proportion of defects in the image inspection step performed by the inspection device 300. For example, the processing unit 501 calculates the inspection defect rate by extracting a quality determination result from the inspection information acquired by the inspection information acquisition unit 520 and obtaining a proportion of defects with respect to the number of inspection times.

The material non-defect rate indicates a proportion of non-defective products in the material drying step performed by the material dryer 200. The processing unit 501 calculates the material non-defect rate by extracting a weight of non-defective products and a weight of defective products from the inspection information acquired by the inspection information acquisition unit 520, and obtaining a proportion of the weight of the non-defective products to a sum of the weight of the non-defective products and the weight of the defective products. That is, the material non-defect rate means a proportion of the weight of the non-defective products to a weight of the material put into the material dryer 200. The material non-defect rate is also referred to as a material yield rate. Quality of the molded product is greatly affected by a dry state of the material. Therefore, in the present embodiment, the material non-defect rate is used as an indicator of quality in the material drying step.

When calculating the material non-defect rate, the processing unit 501 may further add a weight of a material discarded from the start of the molding step until stabilization of the molding or a weight of discarded molded products to a total weight of the non-defective products and the defective products. In addition, for example, a weight of a lost material may be added, such as a weight of a spilled material, a weight of a moistened material, or a weight of an overdried material. In this way, calculation accuracy of the material non-defect rate can be improved.

The output unit 530 outputs a first indicator related to quality in the molding step and a second indicator related to quality in a previous step of the molding step or a subsequent step of the molding step to the display unit 450 of the terminal device 400. In the present embodiment, the first indicator is the defect rate in the molding step, and the second indicator is the inspection defect rate and the material non-defect rate. The output unit 530 outputs a first screen and/or a second screen described below to the display unit 450 in a switchable manner. The output unit 530 needs to be able to output at least the first screen, and may not output the second screen.

FIG. 2 is a diagram illustrating an example of a first screen SC1 displayed on the display unit 450. The first screen SC1 is a screen for mainly displaying a state of the molding step. The first screen SC1 includes a first screen area AR1 and a second screen area AR2. The output unit 530 displays the defect rate in the molding step as the first indicator in the first screen area AR1. The output unit 530 displays the inspection defect rate and the material non-defect rate as the second indicator in the second screen area AR2. The output unit 530 may display, for example, a command value or a measurement value acquired from the injection molding machine 100 in another area of the first screen SC1 as information on the molding step.

FIG. 3 is a diagram illustrating an example of a second screen SC2 displayed on the display unit 450. The second screen SC2 is a screen for mainly displaying a state of the material drying step. The second screen SC2 includes a third screen area AR3 and a fourth screen area AR4. The output unit 530 displays the material non-defect rate as the second indicator in the fourth screen area AR4. The output unit 530 displays the defect rate in the molding step as the first indicator in the third screen area AR3, and further displays the inspection defect rate as the second indicator in the third screen area AR3. The output unit 530 may display, for example, information such as a drying temperature and an air volume in another area of the second screen SC2 as information on the material drying step.

FIG. 4 is a diagram illustrating an example of another second screen SC2*b* displayed on the display unit 450. The second screen SC2*b* shown in FIG. 4 is a screen for mainly displaying a state of the image inspection step. The second screen SC2*b* includes a third screen area AR3*b* and a fourth screen area AR4*b*. The output unit 530 displays the inspection defect rate as the second indicator in the fourth screen area AR4*b*. The output unit 530 displays the defect rate in the molding step as the first indicator in the third screen area AR3*b*, and further displays the material non-defect rate as the second indicator in the third screen area AR3*b*. The output unit 530 may display, for example, the number of non-defective products and defective products in another area of the second screen SC2*b* as information on the image inspection step.

FIG. 5 is a table illustrating a list of contents displayed by the display unit 450. FIG. 5 shows a correspondence relationship between indicators displayed on the first screen SC1 and the second screen SC2 and values of the displayed indicators. In addition, FIG. 5 shows contents of operations that can be performed by an operator in accordance with values of indicators on each screen. For example, when confirming that the material non-defect rate is decreased on the first screen SC1, the operator can restore the material non-defect rate by changing drying conditions such as the air volume and the drying temperature in the material dryer 200. The contents of operations shown in FIG. 5 are an example, and various operations can be performed according to the values of indicators.

According to the injection molding machine management system 10 in the first embodiment described above, the first indicator related to quality in the molding step of the injection molding machine 100 is displayed in the first screen area AR1 of the first screen SC1 that displays the state of the molding step, and the second indicator related to quality in the previous step of the molding step or the subsequent step of the molding step is displayed in the second screen area AR2. Therefore, the operator can confirm not only the quality in the molding step but also the quality in the material drying step as the previous step or in the image inspection step as the subsequent step only by confirming the first screen SC1. Therefore, it is easy to determine in which step a defect occurs that needs to be dealt with. As a result, production efficiency can be improved.

According to the present embodiment, in the second screen SC2 that displays the state of the previous step or the subsequent step of the molding step, the first indicator related to quality in the molding step is displayed in the third screen area AR3, and the second indicator related to quality in the previous step of the molding step or the subsequent step of the molding step is displayed in the fourth screen area AR4. Therefore, the operator can confirm not only the quality in the previous step or the subsequent step of the molding step but also the quality in the molding step only by confirming the second screen SC2. Therefore, it is easy to determine in which step a defect occurs that needs to be dealt with, and thus the production efficiency can be improved.

B. Other Embodiments (B1) In the above embodiment, the processing unit 501 calculates the defect rate in the molding step, the inspection defect rate, and the material non-defect rate as the first indicator and the second indicator. Alternatively, the processing unit 501 may calculate a non-defect rate in the molding step, an inspection non-defect rate, and a material defect rate. In addition, the number of non-defective products and the number of defective products may be obtained rather than the non-defect rate and the defect rate.

(B2) In the above embodiment, the previous step of the molding step is the material drying step, and the subsequent step of the molding step is the inspection step. However, the previous step and the subsequent step of the molding step are not limited to these steps. For example, the previous step of the molding step may include a material conveyance step or a material selection step. The subsequent step of the molding step may include a cleaning step or a packing step of the molded product.

(B3) In the above embodiment, the first screen area AR1 and the second screen area AR2 are simultaneously displayed in the first screen SC1. On the other hand, the first screen area AR1 and the second screen area AR2 may be switched and displayed at predetermined time intervals in the first screen SC1. The first screen area AR1 and the second screen area AR2 may be displayed in different windows in the first screen SC1. The first screen area AR1 and the second screen area AR2 may be displayed on a plurality of display devices respectively, and the plurality of display devices may form one first screen SC1. These modifications are similarly applicable to the second screen SC2 on which the third screen area AR3 and the fourth screen area AR4 are displayed.

(B4) The subsequent step is the image inspection step in the above embodiment, and may include an assembly step, a packing step, and the like. A defect rate in the assembly step is calculated, for example, based on the number of defective products caused by cracking of mounting pawls of molded products in the assembly step of mounting a lid as the molded product to a container. A defect rate in the packing step is calculated based on, for example, the number of molded products dropped by a robot due to a molded product picking error.

(B5) The previous step is the material drying step in the above embodiment, and may include an insert component manufacturing step in hoop molding or insert molding, a first molded product manufacturing step in multi-color molding, and the like. A defect rate in the insert component manufacturing step in the hoop molding or the insert molding may be calculated based on an effective value of a press machine or a machine tool that manufactures an insert component, or may be calculated based on a result of inspection performed before the insert component is inserted into the molding machine. A defect rate in the first molded product manufacturing step in multi-color molding may be calculated based on an effective value of a molding machine at the time when a first molded product is molded, or may be calculated based on a result of inspection performed before the first molded product is inserted into a metal mold for a second molded product and clamped.

C. Other Embodiments

The present disclosure is not limited to the above embodiments, and can be implemented with various configurations within a scope not departing from the gist of the present disclosure. For example, technical features of the embodiments corresponding to technical features of the embodiments described below can be appropriately replaced or combined in order to solve a part or all of the above problems or to achieve a part or all of the above effects. Any of the technical features may be omitted as appropriate unless the technical feature is described as essential herein.

(1) According to the first embodiment of the present disclosure, an injection molding machine management system that manages an injection molding unit is provided. The injection molding unit includes an injection molding machine and a peripheral device that performs a previous step or a subsequent step of a molding step. The injection molding machine management system includes a first display unit that displays a first screen for displaying a state of the molding step of the injection molding machine. The first screen includes a first screen area and a second screen area. The first screen area displays a first indicator related to quality in the molding step of the injection molding machine, and the second screen area displays a second indicator related to quality in the previous step or the subsequent step of the molding step.

According to this embodiment, it is possible to confirm not only the quality in the molding step but also the quality in the previous step or the subsequent step of the molding step by confirming the first indicator displayed in the first screen area in the first screen and the second indicator displayed in the second screen area in the first screen. Therefore, it is easy to determine in which step a defect occurs that needs to be dealt with, and thus the production efficiency can be improved.

(2) In the above embodiment, the injection molding machine management system may further include a second display unit that displays a second screen for displaying a state of the previous step of the molding step or the subsequent step of the molding step of the injection molding machine. The second screen may include a third screen area and a fourth screen area. The third screen area may display the first indicator, and the fourth screen area may display the second indicator. According to this embodiment, the first indicator and the second indicator are displayed not only on the first display unit but also on the second display unit, and thus the quality in the molding step and the quality in the previous step or the subsequent step of the molding step can be confirmed at different locations.

(3) In the above embodiment, the second indicator may be an indicator related to quality in a material drying step, which is a previous step of the molding step. In such an embodiment, it is possible to confirm not only the quality in the molding step but also the quality in the material drying step.

(4) In the above embodiment, the second indicator may be an indicator related to quality in an image inspection step, which is a subsequent step of the molding step. In such an embodiment, it is possible to confirm not only the quality in the molding step but also the quality in the image inspection step.

(5) According to the second embodiment of the present disclosure, an injection molding machine management system that manages an injection molding unit is provided. The injection molding unit includes an injection molding machine and a peripheral device that performs a previous step or a subsequent step of a molding step. The injection molding machine management system includes an output unit that outputs a first indicator related to quality in the molding step of the injection molding machine and a second indicator related to quality in a previous step of the molding step or a subsequent step of the molding step.

What is claimed is:

1. An injection molding machine management system comprising:
 a material dryer configured to dry a source material by removing moisture in air and providing heated air into a drying hopper in which the source material is stored;
 an injection molding machine configured to receive the source material from the material dryer and perform an injection molding operation to form a molded product;
 an inspection device including a camera and a weight sensor, the camera being configured to capture an image of the molded product, the weight sensor being configured to measure a weight of the molded product;
 a first display having a first screen for alternatively displaying a first state of the injection molding operation of the injection molding machine, a second state of a material drying operation of the material dryer, and a third state of an inspection operation of the inspection device, the first screen including a first screen area and a second screen area; and
 a processor configured to execute a program stored in a memory so as to:

receive first, second, and third physical quantity information from the material dryer, the injection molding machine, and the inspection device, respectively;

determine a material non-defect rate based on the first physical quantity information;

determine a molding defect rate based on the second physical quantity information;

determine a molded product defect rate based on the third physical quantity information; and cause the display to:
- in the first state, display information relating to the molding defect rate in the first screen area and information relating to the material non-defect rate and the molded product defect rate in the second screen area;
- in the second state, display the information relating to the material non-defect rate in the first screen area and the information relating to the molding defect rate and the molded product defect rate in the second screen area; and
- in the third state, display the information relating to the molded product defect rate in the first screen area and the information relating to the molding defect rate and the material non-defect rate in the second screen area.

* * * * *